United States Patent [19]

von Geldern

[11] 4,419,573
[45] Dec. 6, 1983

[54] VARIABLE DATA PRODUCT BAR CODE SALES SYSTEM

[75] Inventor: Rudolf C. von Geldern, Alphen a/d Rijn, Netherlands

[73] Assignee: Maatschappij van Berkel's Patent N.V., Leidschendam, Netherlands

[21] Appl. No.: 244,339

[22] Filed: Mar. 17, 1981

[30] Foreign Application Priority Data

Mar. 19, 1980 [GB] United Kingdom ............... 8009275

[51] Int. Cl.³ ............................................. G06K 15/00
[52] U.S. Cl. ..................................... 235/383; 235/375; 235/385
[58] Field of Search ............... 235/383, 375, 378, 384, 235/385, 419

[56] References Cited

U.S. PATENT DOCUMENTS

| | | | |
|---|---|---|---|
| 3,961,747 | 6/1976 | Small | 235/383 |
| 4,002,886 | 1/1977 | Sundelin | 235/383 |
| 4,028,537 | 6/1977 | Snow | 235/383 |
| 4,084,742 | 4/1978 | Silverman | 235/383 |
| 4,139,149 | 2/1979 | Crepeeau | 235/383 |
| 4,264,396 | 4/1981 | Stewart | 235/383 |

Primary Examiner—Harold I. Pitts
Attorney, Agent, or Firm—Lloyd L. Zickert

[57] ABSTRACT

A supermarket with a central computer (I) and a plurality of check-outs (K) each having a bar-code reader (L) and a register (M) connected to the computer (I) for retrieving computer stored sales data pertinent to source-coded saleable products bearing a bar-code label, also comprises a service counter (C) for sales of 'fresh' products whereat a dispenser (D) is provided for issuing bar-code labels having a unique number pre-printed thereon in bar-code form, counter (C) also comprises means (G) connected to computer (I) for determining sales data for each such fresh product (H), reader (F) for identifying the unique number of the pre-printed bar-code label affixed to product (H), reader (F) being connected to computer (I) to thereby address a computer memory location for storage of the fresh product sales data identified by said determining means (G), said fresh product sales data being retrieved from the computer memory location by subsequent operation of the check-out bar-code reader (F) by the pertaining pre-printed bar-code label whereby the fresh product sales data is supplied to the check-out register (M).

4 Claims, 2 Drawing Figures

VARIABLE DATA PRODUCT BAR CODE SALES SYSTEM

This invention relates to bar-coding of sealeable products.

BACKGROUND OF THE INVENTION

A "bar-code" is a graphical code that consists of a number of black bars with variable widths, and of spaces in between the bars with also variable widths (FIG. 1). The widths of the bars, as well as the widths of the spaces in between the bars determine what specific code has been printed. The advantage of such a code is that it is easily readable by an optical scanning system. However, to make this scanning easy (e.g. that no complicated reading equipment is necessary) and reliable the printed bar-code must meet high standards as to edge sharpness, even density of the bars, etc.

Bar-code scanners, hand-held or otherwise, are employed in the check-outs of supermarkets to identify in rapid succession the products being bought by the customer. Each identification thus made must be unambiguous regarding the type and quantity (size) of the product. Products, which are identical in type and quantity may carry the same identification code (such as all 1-kg bags of white refined sugar from the XYZ Sugar Company). Since such products are usually manufactured in large series, it is most economical to affix the identification code to the product while manufacturing and packing it; this takes place invariably at a location away from the supermarket ("source coding"). The code of such products usually defines the country of origin, the manufacturer and the type of product including the invariable quantity or size.

When the product with its bar-code is scanned at the check-out, this identification is used to call the appropriate selling price of the product from computer memory, to register the sale of the product on a customer receipt, to add the price of the product to the customer bill, and to record the sale of one unit of the product for stock keeping and accounting purposes.

The majority of food products sold by a supermarket can be source marked by a bar-code as described above, because quantities have predetermined and fixed values. However, there are some types of commodities where the quantity sold varies from item to item; in particular this is the case for fruit and vegetables, delicatessen, bread and sweets, cheese and meat products of a large variety. Such products are usually sold "fresh", i.e. they are not portioned and packed until the customer expresses his intent directly to buy the product, with an indication of the approximate quantity he desires. Since at this time exact portioning to standard quantities is most often not possible, the quantity will vary from portion to portion; and so with the price which has to be paid. Identifying such products with codes containing only the origin and nature is therefore not sufficient. The commonly accepted notion is that in these cases the code must also contain information regarding the quantity or size, and/or its related price. The code for such variable weight products should consequently be printed after the quantity or price has been established, i.e. after the portioning according to the customers wish has taken place, and after the quantity of the order has been determined (i.e. by weighing).

Since this situation occurs at service counters of supermarkets, the notion would lead to the necessity of placing a bar-code printer for variable codes on or in the immediate vicinity of such service counters.

However since, as already stated above, a bar-code label has to meet high standards as to printing quality, the printers are usually complex, and therefore relatively large machines, so that they require a lot of space at a service counter. Since they are complex mechanisms they will also usually be sensitive to dirt, so that a supermarket service counter is not the right place to put them.

The problem to be solved by the invention therefore is to be able to code articles with variable qualities, with a bar-code, without having to place a large and sensitive bar-code printer on the service counters.

The present way of reaching this aim has been to make smaller printers. The quality of these printers however has not yet met the standards that are required for an easy and reliable scanning of the printed code.

SUMMARY OF THE INVENTION

According to the present invention each saleable product ordered by a customer at a service counter is identified with a bar-code label having a unique number preprinted thereon, the label is scanned and the unique number used to address a computer memory location to which sales data relating to the pertaining product are supplied from the service counter, the sales data being retrieved from the computer memory location and supplied to the check-out in response to scanning of the bar-code label thereat.

Thus the present invention uses a different way of identifying in an unambiguous manner the variable weight products ordered over the service counter and to be paid for at the check-out register(s).

Basically, each item ordered by the customer is "tagged" by a number. Each item ordered by a customer during the course of a certain time period (e.g. a day) carries a different number, such that the identification of each item by that number is unambiguous.

It would be logical to apply sequentially increasing numbers, but any other sequence of numbers will do, provided no number shall be issued more than once during the applicable time frame.

The fact that the length of the time frame is limited also means that the set of numbers to be issued is limited, and therefore manageable. As a consequence, this limited number set can be identified by a prefix (such as an in-house prefix as defined by EAN and UPC specifications) or any other means, and the number set can be used as "carriers" or "addresses" for relevant sales data regarding the product, such as type, origin, freshness, exact quantity and price as well as method of preparation, ultimate consumption date etc.

All such information can be stored, processed or transported, either electronically or by other means, with its unique identification number acting as carrier or data address.

The information package pertaining to an item ordered by a customer is therefore awarded an identification number at the service counter; this information package can be retrieved at any time within the time frame at the check-out register by identifying the unique item number and recalling the associated information package.

In particular the bar-coded number is associated with a specific memory address in the central computer, at which address all data concerning the item to be bought by the customer are stored. As soon as the information has been withdrawn from the memory, has been printed upon the bill, and the bill has been paid by the customer so that there is no longer any need to store the concerning data, this memory address is vacated and another bar-code number can be associated with that specific address. This reduces the amount of computer memory space that is necessary. This also means that the memory address does not have to be, and usually will not be, the same number as the bar-code number it is associated with.

BRIEF DESCRIPTION OF THE DRAWINGS

One system for implementing the present invention will now be described by way of example with reference to the accompanying drawings, in which.

DESCRIPTION OF THE PREFERRED EMBODIMENT

The illustrated system operates as follows:

(1) Preprint labels with bar-coded identification numbers using printer A in print shop B and place label roll on service counter (C) in dispenser (D).

Figure 1:
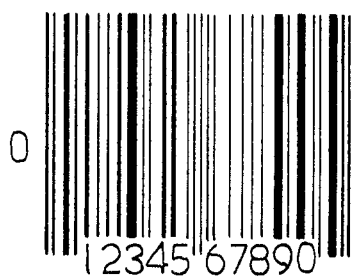
FIG. 1 illustrates a preprinted bar-code label.
Figure 2:
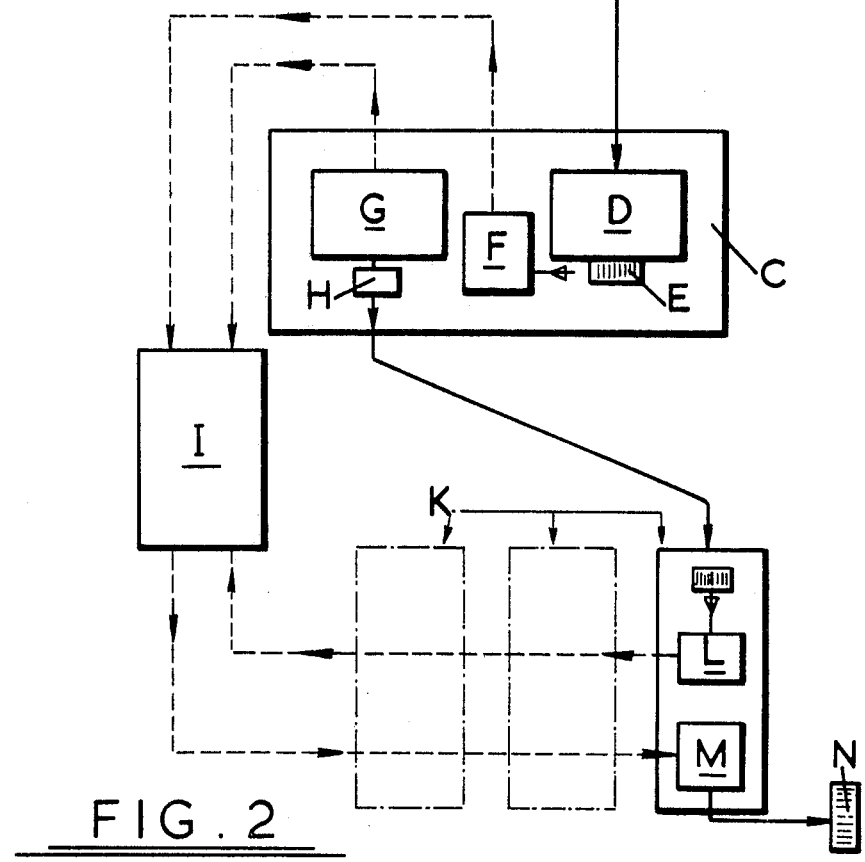
FIG. 2 is a schematic drawing of the system.

(2) When the weight and price of the goods ordered by a customer have been determined by scales G, these goods are packed. A bar-code label (E) is removed from the roll by dispenser (D), its number is read by reader (F) (for example the FIG. 1 label represents the number 1234567890), and the label affixed to the package (H).

(3) The weight and price information together with the bar-code label identification number is transmitted by the scales G and reader F to the computer I.

(4) The information is stored temporarily in the central computer memory or any other back-up memory.

(5) The customer, after having completed his selection of items to be purchased, takes the goods to the check-out K.

(6) All goods are scanned by check-out reader L.

(7) When an item carries a bar-code identification number, all pertinent information is retrieved from the memory of computer I.

(8) The information is forwarded to the check-out register terminal M, where (9) The customer receipt N is printed.

(10) When the transaction is complete, the details of the sale can be recorded by the computer for accounting or bookkeeping purposes: afterwards the identification number is vacated.

The important quality of this system is the fact that the identification number itself does not contain "variable" information and is "fixed", or at least predetermined in nature (where sequentially increasing numbers are used, of course each identification number is one unit higher than the previous number). Because of this fact, the bar-coded identification number can be pre-printed, away from the service counter.

A series of bar-code identification numbers can be printed for instance on a roll of labels, and this printing can be done in a professional print shop, assuring high printing standards as well as high scannability at the checkout. What remains to be done at the service counter is to couple the "variable" information of the goods being bought by the customer to any one bar-code identification number.

This means that virtually all items sold by supermarkets become scannable, including the variable weight/price items served to the customer over the counter.

As a result, check-out time can be drastically reduced because the check-out operator no longer has to mix key entries with scanning operations, nor will he have to decide with each item whether it is scannable or a key entry item.

This overall advantage can be obtained without having to print variable bar-codes on the counter; such printing is technically difficult and operationally cumbersome.

A major condition to be fulfilled, however, is that both scales on the service counters and scanner/registers in the check-out must be connected "on-line" to the central computer; with so-called "scan-alone" registers, the variable information cannot be transmitted from scale to register in a timely manner.

A secondary advantage of this invention is that shrinkage is easily determinable. When at the end of a day a certain identification number has not been vacated from the computer memory the item concerned may have been stolen. The shopkeeper then only has to read the information from the memory address that has been related to the non-vacated number to see what items and to which amount has been stolen.

What is claimed is:

1. In a supermarket having a central computer and at least one check-out with a bar-code reader and a register each connected to the computer for retrieving computer-stored sales data corresponding to source-coded saleable-products bearing a bar-code label, the improvement which comprises providing a service counter for sales of 'fresh' products of variable weight and/or price, said service counter comprising a dispenser of bar-code labels each having a unique number pre-printed thereon in bar-code form, means for determining sales data for each said 'fresh' product, said means being connected to said computer, a reader for identifying the unique number of a said pre-printed bar-code label and connected to said computer to thereby address a computer memory location for storage of the fresh product sales data identified by said determining means, said fresh product sales data being retrieved from the computer memory location by subsequent operation of the check-out bar-code reader by the pre-printed bar-code label corresponding to said sales data and supplied to the check-out register.

2. The arrangement claimed in claim 1, wherein said pre-printed bar-code labels are arranged in sets each of which incorporates set-identification data pre-printed thereon in bar-code form, said dispenser is arranged to dispense labels from a single set within a predetermined time frame, and said computer is arranged to prevent said retrieval of said fresh-product sales data except within said predetermined time frame.

3. The arrangement claimed in claim 1, wherein said computer is arranged to clear each said memory location following retrieval of the corresponding sales data therefrom.

4. The arrangement claimed in claim 1, wherein said determining means is manually operable and said sales data is selected from the group comprising product type, product origin, product freshness, product quantity, product price, product preparation, product consumption date.

* * * * *